May 12, 1959 — C. A. DAVIS — 2,886,055
DISPENSER FOR LIQUID PETROLEUM GAS
Filed Dec. 12, 1955 — 2 Sheets-Sheet 1

INVENTOR.
CHARLES A. DAVIS
BY
Kenneth W. Miller
ATTORNEY

May 12, 1959
C. A. DAVIS
2,886,055
DISPENSER FOR LIQUID PETROLEUM GAS
Filed Dec. 12, 1955
2 Sheets-Sheet 2
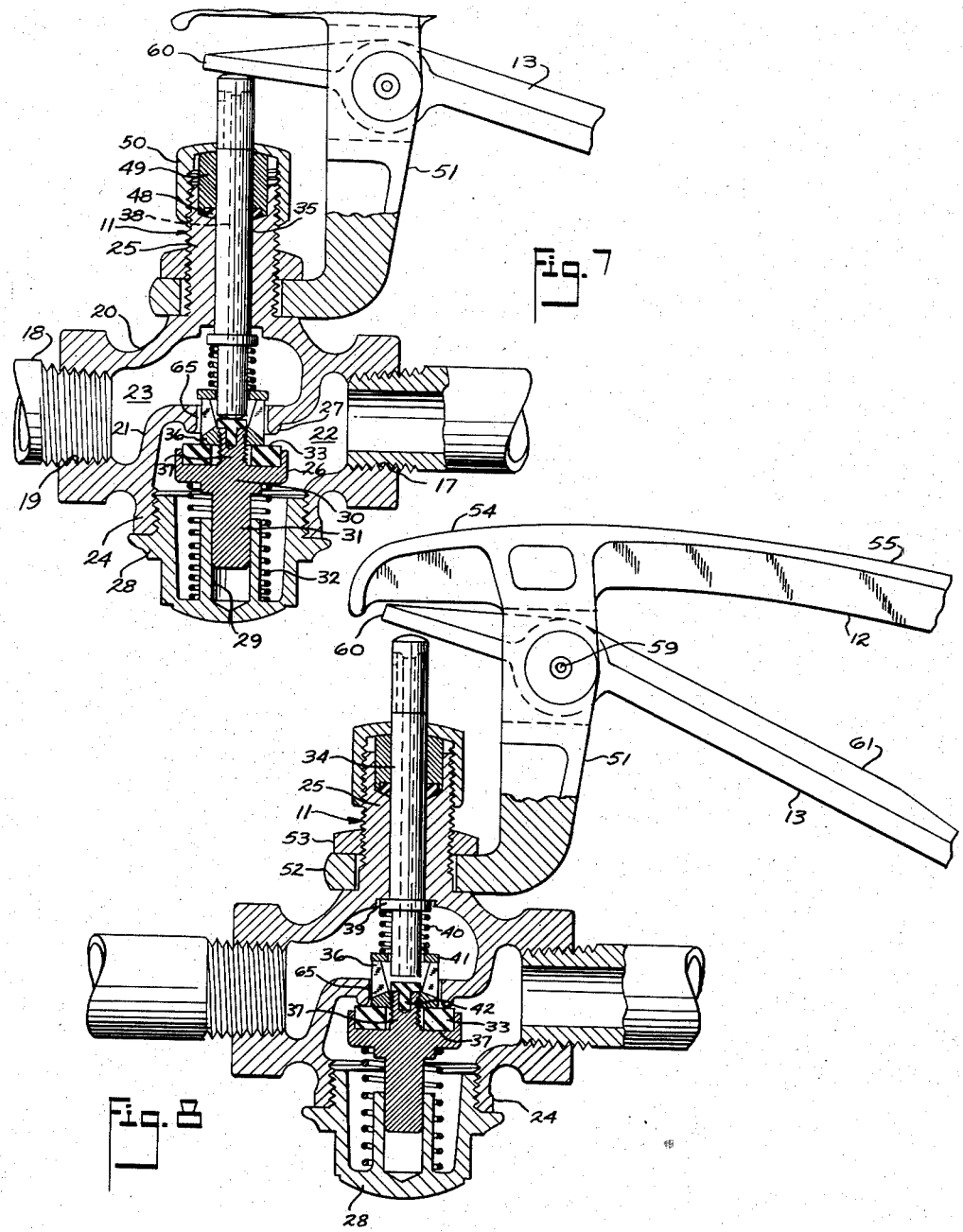
INVENTOR.
CHARLES A. DAVIS
BY
*Kenneth W. Miller*
ATTORNEY

United States Patent Office 2,886,055
Patented May 12, 1959

2,886,055

DISPENSER FOR LIQUID PETROLEUM GAS

Charles A. Davis, Mansfield, Ohio, assignor to The Ohio Brass Company, Mansfield, Ohio, a corporation of New Jersey Application December 12, 1955, Serial No. 552,476

6 Claims. (Cl. 137—382)

This invention relates to a dispenser for liquid petroleum gas.

A principal object of the invention is to provide a dispensing means for use in liquid petroleum gas distribution or delivery systems which is adapted to protect the operator from contact with the gas.

Another object of the invention is to provide a petroleum gas dispenser having a safety relief means.

Still another object of the invention is to provide a dispensing arrangement for liquid petroleum gas systems incorporating a relief or by-pass valve in which the relief function cannot be interfered with during use or because of abuse of the apparatus.

In liquid petroleum gas distributing systems, it is customary to use a tank truck for delivering the liquefied gas to the distributor's or consumer's storage tank. In such arrangements, a flexible hose is utilized to connect the truck tank to the storage tank to transmit the liquefied gas from the tank truck to the storage tank and it is usual to incorporate a valve in the line at the truck tank as well as in the permanent line from the connecting point to the storage tank. Such arrangements are, of course, similar to those used in distribution of gasoline and similar fluids and are seemingly relatively simple and fool proof.

However, as applied to the distribution and delivery of liquefied gas, certain difficulties arise in practice. Particularly, it has been found that when the valve at the truck is closed, and the hose disconnected from the storage tank line, the operator is liable to receive serious burns from the residual gas remaining in the hose which, although vaporized after the hose is disconnected, is intensely cold. Accordingly, it has been the practice to utilize two valves for controlling the gas flow, one at the truck tank and another at the storage tank end of the hose, both of which are closed before the hose is disconnected from the storage tank line.

The present invention is concerned with the valve arrangement last referred to, e.g. for connecting the hose from the tank to the storage tank line. In particular, the invention is concerned with a dispenser which incorporates a hose valve in which the outlet line is in communication with the outside atmosphere, except when positively operated. The hose valve incorporates a relief opening in the stem which is closed when the valve is operated.

The invention is also concerned with a novel handle and guard arrangement whereby the valve stem is protected against the use and abuse to which such apparatus is ordinarily subjected and whereby positive operation of the relief means is insured.

The invention, together with the objects, features, and advantages thereof, will be more clearly understood from a consideration of the following detailed description and claims, taken in connection with the appended drawings, in which:

Figs. 7 and 8 are enlarged views of a portion of the dispenser of Fig. 1 and showing the valve in its open and closed conditions respectively.

Figure 1:
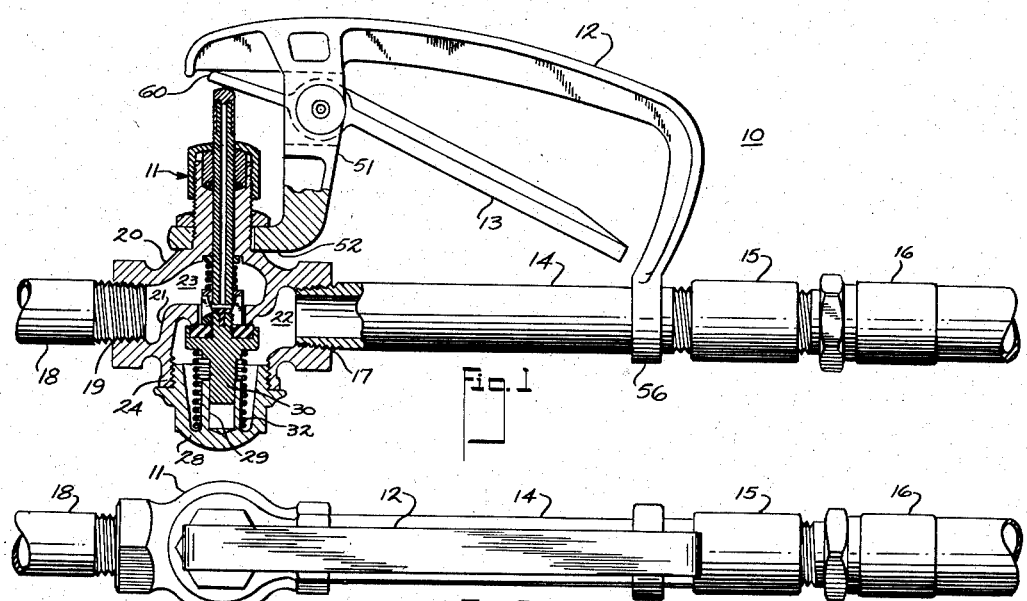
Fig. 1 is a side elevation of the dispenser of the invention with a portion of the valve shown in section.
Figure 2:
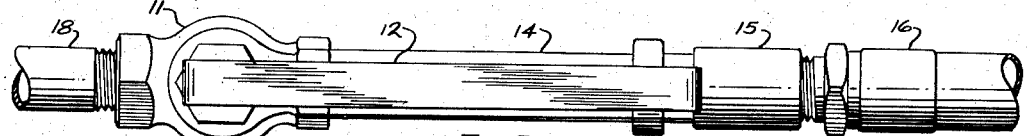
Fig. 2 is a top view of the dispenser of Fig. 1.

Referring now to Fig. 1, the dispenser 10 of the invention comprises an assembly including a globe valve 11, a guard 12, a handle 13, and a conduit 14 with a coupling 15 at the outer end thereof for connecting to a hose 16. The conduit 14 is received in the inlet 17 of the valve 11 and is intended to receive the liquid petroleum gas from the truck tank as is described in the introductory portion of this specification. A similar conduit 18 is threaded in the outlet 19 of the valve and is connected to the storage tank line, also referred to in the introductory portion of the specification.

The organization and construction of the valve 11 will best be understood from a consideration of Figs. 7 and 8 taken in connection with Fig. 1. As shown therein, the valve 11 constitutes a body 20 which is integrally formed with the inlet 17, outlet 19, and an internal partition 21 dividing the interior of body 20 into an inlet chamber 22 and an outlet chamber 23, an internally threaded valve seat part 24, and an externally threaded stem part 25.

Fluid communication between the inlet chamber 22 and outlet chamber 23 is accomplished through a valve opening 25. A valve member 26 cooperates with the valve seat 27 formed integrally with the partition 21 on the inlet side thereof.

The valve member 26 is held and guided by a member 28 which is threaded into the part 24 of the valve body 20 and has a cylindrical portion 29 formed on the inside thereof. The valve member 26 includes a metallic body part 30 which has a round downwardly projecting portion 31 received in the central opening of the portion 29 of the member 28. The part 31 is arranged to slide freely in the part 29 and is urged upward by a spring 32 so that the gasket 33 normally bears against the seat 27 to close the valve opening 25.

The valve member 26 is operated by a valve stem 34 which has the upper part thereof carried in a longitudinal opening 35 in the stem part 25 of the valve body 20. The lower portion of the stem is received between three prongs which are formed integrally as a single member 36 and are threaded onto the upper portion 37 of the piece 30. The member 35 is normally disposed within the valve opening 25 and has the three prongs radially disposed in such a fashion that the flow between the inlet and outlet chambers is not interfered with. The member 36 also serves to compress and hold the gasket 33 in the annular groove 37 in the upper part of the piece 30.

The stem 34 is arranged in such a fashion that when the handle 13, stem 34, and valve member 36 are in an unoperated position, a relief passage from the outlet chamber 23 to the external atmosphere is provided through the body of the stem. To this end (referring also to the Fig. 4) the stem 34 is formed with a central opening 38 longitudinally therethrough. A collar 39 toward the lower end of the stem 33 is arranged to bear against the lower inside part of the stem part 25 of the body 20 while a spring 40 and a washer 41, arranged to bear upon the upper end of the prongs of the member 36, normally hold the stem so that the lower end of the opening 38 is in communication with the outlet chamber 23 of the valve. A nipple 42 is received in a recess at the upper end of the portion 37 of the piece 30 and is arranged to close the lower end of the opening 38 when the stem is moved downward to operate the valve member 26.

A cap 43 is provided at the upper end of the stem 33 and has a radial opening in the wall thereof for providing communication between the opening 38 and the atmosphere. A gasket 45 is arranged within the upper part of the interior of the cap 43 and serves to close the upper end opening 38 when the cap 43 is engaged and operated by the handle 13. A groove 46 in the stem and a projection 47 on the cap serve as a detent for holding the cap 43 in position on the outer end of the stem 34.

The stem opening 35 is closed at the upper end by an O-ring 48 which is held by a pressure member 49, and a cap 50 which is threaded on the stem part 25 of the valve body 20.

Figure 3:
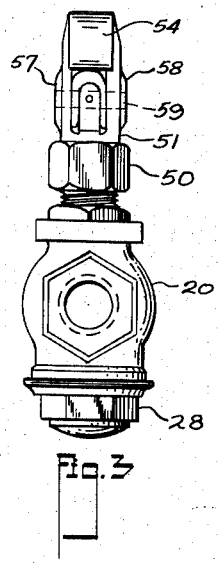
Fig. 3 is an elevation view taken from the left end of Fig. 1.

The guard 12 comprises a unitary metallic member having a vertical part 51 with a horizontally disposed forwardly extending part 52 at the lower end received over the stem part 25 and held in position by a nut 53. The upper end of the part 51 joins a horizontal part 54 which extends forwardly over the stem 34 and a part 55 extending horizontally away from the stem and downwardly and about the conduit 14 at the eye 56. As shown also in Fig. 3, the part 51 of the guard 12 has spaced side portions 57 and 58 adjacent its upper end between which the handle 13 is disposed. The side portions 57 and 58 hold a pin 59 on which the handle 13 is pivoted.

The forward end 60 of the handle is disposed between the stem 34 and cap 43 and the guard part 54 and is arranged to depress the stem and cap when the handle is operated and to engage the underside of the guard part 54 when the handle is in an unoperated position. The part 61 of the handle 13 is substantially longer than the part 60 and over-balances the part 60 when the dispensing device is normally disposed in an upright position.

In use the dispenser is coupled to one end of a dispensing hose, which is connected at its remaining end to the valve of the truck tank, while the outlet 19 is suitably connected by means of conduit 18 and a quick acting coupling to the storage tank line. The truck tank valve is then opened to permit the liquid petroleum gas to flow into the hose 16. The storage tank valve is then opened and the handle 13 is pulled upwardly toward the guard 12. As a result the part 60 of the handle engages the cap 43 to bring the gasket 45 into engagement with the upper end of the stem 34, whereupon the stem is moved downwardly against the spring 40. The lower end of the stem 34 engages the gasket 42 and moves the valve piece 26 downwardly to open the valve opening 25 and permit the liquid gas to flow from the inlet chamber 22 to the outlet chamber 23 and thence through the conduit 18 and storage tank line to the storage tank.

When the storage tank is filled, the handle 13 is released thus permitting the valve piece 26 to be moved upwardly by the spring 32 to bring the gasket 33 into engagement with the seat 27 and close the valve. Simultaneously therewith, the spring 40 moves the stem 34 upwardly so that the lower end of the stem becomes disengaged from the gasket 42 and thereby bringing the lower end of the opening 38 into communication with the outlet chamber 23. The storage tank and truck tank valves are, of course, closed as soon as the handle 13 of the dispenser 10 is released.

As a result of the communication between the opening 38 at the lower end of the stem and the outlet chamber 23, any liquid petroleum gas remaining in the outlet chamber, or the conduit 18, or the storage tank line on the adjacent side of the storage tank valve, is permitted to escape through the opening 38 and the opening 44 as soon as it becomes vaporized and the vapor pressure within those parts is reduced to that of the external atmosphere. Consequently, when the operator uncouples the conduit 18 from the storage tank line, there will be no back pressure which would tend to create an escaping stream of gases at the time of uncoupling which would bring the lower temperature gas into contact with the operator's body.

The arrangement of the handle and guard is a particularly important aspect of the invention, inasmuch as it is essential that the relief means be always operable. As will be evident, the hose ordinarily receives a great deal of handling and it has been found that with ordinary arrangements the relief means will not be maintained in an operative condition, or, that even if the hose and dispensing apparatus are handled carefully, an occasional accidental blow may disable the relief mechanism without such disability being noticed by the operator.

Figure 5:
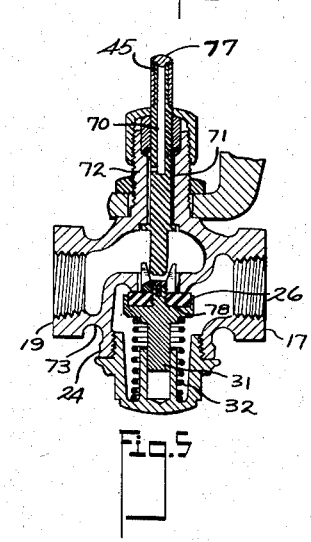
Fig. 5 is a vertical sectional view of another valve useful in the practice of the invention.
Figures 4, 6:
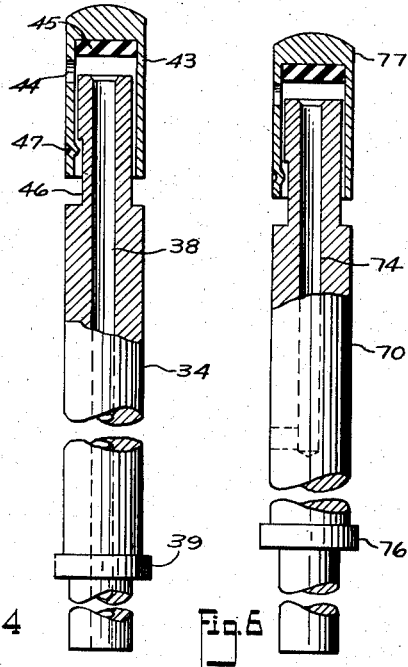
Fig. 4 is an enlarged view of the stem of the valve of Fig. 1.
Fig. 6 is an enlarged view of the stem of the valve of Fig. 5.
Figure 9:
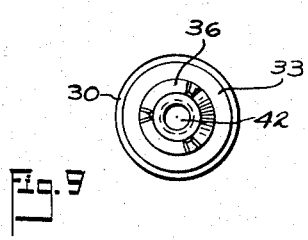
Fig. 9 is a top view of the valve member.

Referring now to Figs. 5 and 6, there is shown another form of valve which is useful in the practice of the invention. As shown therein, the stem 70 is received in an opening 71 in the stem part 72 of the valve body 72, which opening is somewhat larger than the stem itself. An opening 74 extends from the upper end of the stem longitudinally along the axis of the stem to open radially outwardly at body 75 above the collar 76 of the stem. A cap 77 is arranged in the same manner as the cap 43 of Fig. 4.

In operation, a valve part 78 is operated by the stem 70 in the same fashion as valve piece 26 is operated by the stem 34. However, in an unoperated position, stem 70 ordinarily rests upon the valve piece 78 so that the outlet chamber of the valve is in communication with the outside atmosphere through the opening 71 and the stem opening 74.

It is to be understood that the foregoing description is not intended to restrict the scope of the invention and that various rearrangements of the parts and modifications of the design may be resorted to, giving effect to a liberal interpretation of the classes as hereinafter set forth.

I claim:

1. In a dispenser for liquid petroleum gas distributing apparatus including a valve having an inlet and an aligned outlet, a partition in the valve with a valve opening for fluid communication between the inlet and outlet, a valve member and means normally holding the valve member in a closed position, a reciprocable stem engaged at its inner end with the valve member for actuating the valve member and a bleeder opening longitudinally through the stem normally communicating with the outlet and closed by the valve member when the stem is engaged therewith and an outwardly projecting body part supporting the stem, the combination which comprises a conduit threaded in the valve inlet and means at the outer end of the stem for connection to a supply line having an on-off valve, a handle and stem guard comprising a unitary member having a vertical part generally parallel to the stem and the lower portion thereof extending horizontally over and around the said body part of the valve and a part extending horizontally from the upper end of the vertical part forward over the valve stem to protect the stem, and another part extending horizontally away from the stem and downwardly and about the conduit, a nut threaded on the said body part for holding the guard, and a handle pivoted on the vertical part of the guard member and extending forward between the stem and the guard at the one end thereof and engaged with the end of the stem for closing the bleeder opening and opening the valve and back along the conduit and within the handle guard in the opposite direction from the pivot.

2. The invention in accordance with claim 1 in which the stem has a cap on the outer end thereof engageable by the said one end of the handle for closing the longitudinal opening and actuating the valve stem, the said cap having a relief opening normally communicating with the longitudinal opening in the stem, and in which the outwardly extending portion of the guard member protects the stem and the cap.

3. In a dispenser for liquid petroleum gas distributing apparatus including a valve having an inlet and outlet in fluid communication with each other and a valve member normally preventing flow therebetween, a reciprocable stem engaged at its inner end with the valve member for opening the valve and a bleeder opening longitudinally through the stem normally communicating with the outlet and closed by the valve member when the stem is engaged therewith, and an outwardly projecting body part supporting the stem, the combination which comprises a conduit attached to the valve, a handle and stem guard comprising a member having a vertical part generally parallel to the stem extending at its lower end about the body part of the valve supporting the stem and with means threaded on the said body part for holding the guard to the valve and a part extending horizontally from the upper end of the vertical part over the valve stem to protect the stem and another part extending horizontally away from the stem and downwardly and secured to the conduit, and a handle within the guard pivoted on the vertical part of the guard member and extending between the stem and the guard and engaged with the end of the stem for closing the bleeder opening and opening the valve when the handle is operated.

4. The invention in accordance with claim 3, in which the stem has a cap on the outer end thereof engageable by the handle for closing the longitudinal opening and actuating the valve stem, the said cap having a relief opening normally communicating with the longitudinal opening in the stem, and in which the horizontally extending portion of the guard member protects the stem and the cap.

5. A valve comprising a body having aligned inlets and outlets and an internal partition integral with the body and forming inlet and outlet chambers, a valve opening in the partition and a seat about the opening on the inlet side of the partition, a stem part of the body above the partition with an opening to receive a valve stem, an opening in the body below the partition with an internal thread and a member threaded in the opening, a cylindrical piece formed on the interior of the said last named member aligned with the valve opening, a valve piece having a round part sliding in the cylindrical piece at one end and a gasket at the opposite end thereof for engaging the valve seat to close the valve opening, and a spring between the valve piece and the threaded part for normally urging the valve piece and gasket toward the partition, an integral piece comprising a base and three spaced projecting prongs threaded on the valve piece and disposed within the valve opening, a valve stem arranged to slide in the opening in the stem part, a collar on the lower part of the stem arranged to bear against the interior of the valve body, a washer disposed about the stem and resting on the prongs of the said integral piece and a spring between the washer and collar whereby the stem is normally urged away from the valve piece, a longitudinal opening through the stem in normal communication with the outlet chamber to provide a relief therefor, and a gasket carried by the valve piece between the prongs in alignment with the stem for closing the opening in the stem when the stem is moved into engagement with the valve piece to open the valve.

6. The invention in accordance with claim 5 and including a cap at the outside end of the stem arranged to slide on the stem, a radial opening through the wall of the cap to provide communication between the stem opening and the outside of the cap, and a gasket fitted in the interior of the cap opposite the end of the stem to close the stem opening when the cap is moved into engagement with the stem to operate the valve.

References Cited in the file of this patent

UNITED STATES PATENTS

| 1,177,019 | Coll | Mar. 28, 1916 |
| 2,271,151 | Fina et al. | Jan. 27, 1942 |
| 2,534,509 | Franck | Dec. 19, 1950 |
| 2,544,556 | Kunert | Mar. 6, 1951 |
| 2,793,653 | Payne | May 28, 1957 |

FOREIGN PATENTS

| 362,573 | Italy | Aug. 30, 1938 |
| 456,893 | Italy | Apr. 26, 1950 |
| 1,015,287 | France | July 2, 1952 |
| 513,478 | Belgium | Aug. 30, 1952 |